United States Patent Office
3,117,143
Patented Jan. 7, 1964

3,117,143
OPTIONALLY 17-ALKYLATED 17-OXYGENATED 3,5-CYCLOANDROSTANE-6β,19-DIOLS AND INTERMEDIATES THERETO
Paul B. Sollman, Wilmette, Ill., assignor to G. D. Searle & Co., Chicago, Ill., a corporation of Delaware
No Drawing. Filed Nov. 23, 1962, Ser. No. 239,774
7 Claims. (Cl. 260—397.4)

The present invention relates to novel 19-hydroxylated 3,5-cyclosteroids and, more particularly, to 17-oxygenated 3,5-cycloandrostane-6β,19-diols optionally carrying a 17-alkyl or 17-alkynyl substituent. These substances are specifically represented by the structural formula

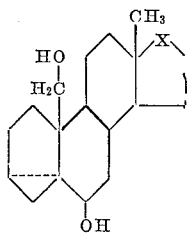

wherein X is a carbonyl, β-hydroxymethylene, α-(lower alkyl)-β-hydroxymethylene, or α-(lower alkynyl)-β- hydroxymethylene radical.

The lower alkyl radicals encompassed in the X term are typified by methyl, ethyl, isopropyl, secondary-butyl, tertiary-pentyl, isohexyl, and groups isomeric therewith containing less than 7 carbon atoms. Examples of the lower alkynyl radicals comprehended in the X term are ethynyl, propynyl, butynyl, pentynyl, hexynyl, and the branched-chain groups isomeric therewith.

The novel 19-hydroxy compounds constituting the present invention can be conveniently manufactured by utilizing 6β-hydroxy-3,5-cycloandrostan-17-one as the starting material. That substance is contacted with lead tetraacetate in a suitable inert solvent such as benzene to yield 6β,19-dihydroxy-3,5-cycloandrostan-17-one. The reduction of that compound with a suitable reducing agent, typically lithium aluminum hydride or sodium borohydride, affords 3,5-cycloandrostane-6β,17β,19-triol.

The 17-alkylated compounds of the present invention are obtained by reaction of the aforementioned 6β,19-dihydroxy-3,5-cycloandrostan-17-one with the appropriate alkyl organometallic reagent. That 17-one is allowed to react with methyl magnesium bromide, for example, in ether solution, and the resulting adduct is hydrolyzed with water to afford 17α-methyl-3,5-cycloandrostane-6β,17β,19-triol.

When 6β,19-dihydroxy-3,5-cycloandrostan-17-one is contacted with an alkynyl organometallic reagent, the 17α-alkynyl-17β-ols of the present invention result. As a specific example, that 17-one is contacted with lithium acetylide in tetrahydrofuran to produce 17α-ethynyl-3,5-cycloandrostane-6β,17β,19-triol. These 17-alkynyl substances may be used as intermediates to the aforementioned 17-alkyl compounds wherein the alkyl group contains more than one carbon atoms. 17α-ethynyl-3,5-cycloandrostane-6β,17β,19-triol, for example, is catalytically hydrogenated, typically in ethanol with hydrogen in the presence of 5% palladium-on-carbon catalyst, to yield 17α-ethyl-3,5-cycloandrostane-6β,17β,19-triol.

The compounds of the present invention are useful as intermediates in the manufacture of known compounds possessing valuable pharmacological properties. The reaction of the instant 6β,19-dihydroxy-3,5-cycloandrostan-17-one, for example, with formic acid in the presence of a catalytic quantity of triethylamine followed by hydrolysis of the resulting diformate with aqueous sodium hydroxide in methanol affords 3β,19-dihydroxyandrost-5-en-17-one, useful as a local anesthetic and sedative agent and also as an intermediate to the corresponding 19-nor compounds, as is described in U.S. Patent 2,856,415. Conversion of these intermediates to the corresponding 19-nor compounds is specifically illustrated by the reaction of 6β,19-dihydroxy-3,5-cycloandrostan-17-one with formic acid and triethylamine followed by Oppenauer oxidation of the resulting diformate to yield 19-hydroxyandrost-4-ene-3,17-dione, oxidation of the latter substance in acetone with chromic acid to produce 19-oxoandrost-4-ene-3,17-dione, and finally reaction of that 19-oxo compound with aqueous sodium hydroxide in methanol to yield 19-norandrost-4-ene-3,17-dione. The optionally 17-alkylated 19-nor-17β-hydroxyandrost-4-en-3-ones are well-known anabolic agents and the corresponding 17-alkynyl substances are known progestational agents.

The following examples describe in detail certain of the compounds illustrative of the present invention and methods which have been devised for their manufacture. However, the invention is not to be construed as limited thereby either in spirit or in scope since it will be apparent to those skilled in the art that many modifications both in materials and in methods may be practiced without departing from the purpose and intent of this disclosure. In the examples hereinafter detailed, temperatures are given in degrees centigrade (° C.) and quantities of materials in parts by weight except as otherwise noted.

*Example 1*

To a solution of 5 parts of 6β-hydroxy-3,5-cycloandrostan-17-one in 440 parts of dry benzene is added 16.5 parts of lead tetracetate, and the resulting reaction mixture is heated at the reflux temperature for about 6 hours, then is cooled and filtered. The filtrate is washed with water, is then filtered to remove the precipitated solid and is washed with water again until neutral. This organic solution is chromatographed on a silica gel column and is eluted with ethyl acetate-benzene mixtures. The 40% ethyl acetate in benzene eluate is concentrated to dryness to afford 6β,19-dihydroxy-3,5-cycloandrostan-17-one, melting at about 177–179°. It is represented by the structural formula

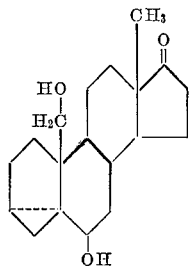

Example 2

To a solution of 2 parts of lithium aluminum hydride in 178 parts of tetrahydrofuran is added a solution of 3.4 parts of 6β,19-dihydroxy-3,5-cycloandrostan-17-one in 44 parts of tetrahydrofuran, and the resulting reaction mixture is stirred at room temperature for several minutes. Excess saturated aqueous sodium potassium tartrate is added, and the organic layer is diluted with water, then is extracted with methylene chloride. The methylene chloride layer is separated and concentrated to afford a residue which is crystallized first from ether-hexane then from aqueous methanol to yield 3,5-cycloandrostane-6β,17β,19-triol as a solvate, melting at about 126–128°. Drying of this material at 135° and 0.01 mm. of mercury pressure affords 3,5-cycloandrostane-6β,17β,19-triol as a glass. It is represented by the structural formula

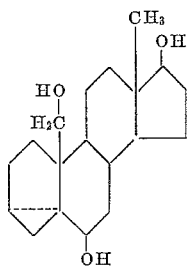

Example 3

To a solution of 0.52 part of sodium borohydride in 17 parts of methanol containing 0.2 part by volume of 10% aqueous sodium hydroxide is added 1.25 parts of 6β,19-dihydroxy-3,5-cycloandrostan-17-one. This reaction mixture is kept at room temperature for about one hour, at the end of which time a small quantity of acetic acid is added to decompose the excess reducing agent. Approximately 250 parts of water is added, and the resulting crystalline product is collected by filtration to afford solvated 3,5-cycloandrostane-6β,17β,19-triol, melting at about 121–126°, and identical with the product of Example 2.

Example 4

To a solution of 1.05 parts of 6β,19-dihydroxy-3,5-cycloandrostan-17-one in 210 parts of dry ether is added 20 parts by volume of 3 N methyl magnesium bromide in ether, and this reaction mixture is stirred at room temperature for about 16 hours. To the mixture is then added successively 450 parts of ethyl acetate and 500 parts of water, and the organic layer is separated, dried over anhydrous sodium sulfate, and stripped of solvent to afford an oil. Crystallization of this oil from ether-hexane affords 17α-methyl-3,5-cycloandrostane-6β,17β,19-triol, melting at about 223–226°, and characterized also by infrared absorption maxima at about 2.81, 3.02, 3.20, 6.80, 9.36, 9.52, 9.71, and 10.50 microns. This substance is represented by the structural formula

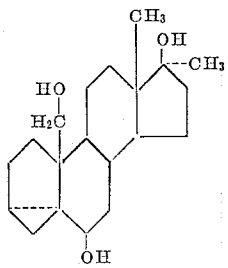

Example 5

To a mixture of 6 parts of a complex containing one molecular equivalent of lithium acetylide and one molecular equivalent of ethylene diamine in 89 parts of tetrahydrofuran is added 2.5 parts of 6β,19-dihydroxy-3,5-cycloandrostan-17-one, and the resulting reaction mixture is stirred at room temperature for about 2 hours. The addition of water results in separation of the crude product as an oil. This oil crystallizes on standing, then is recrystallized from acetone-hexane to yield 17α-ethynyl-3,5-cycloandrostane-6β,17β,19-triol, melting at about 225–235°. It exhibits a characteristic infrared absorption maximum at 3.04 microns and is represented by the structural formula

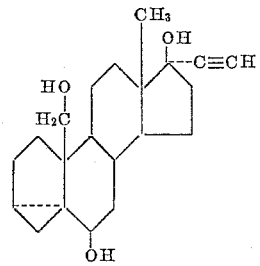

Example 6

A mixture of 5.59 parts of 17α-ethynyl-3,5-cycloandrostane-6β,17β,19-triol, 320 parts of ethanol, and 0.6 part of 5% palladium-on-carbon catalyst is shaken in a hydrogen atmosphere at atmospheric pressure and room temperature until 2 molecular equivalents of hydrogen are absorbed. The catalyst is removed by filtration, and the filtrate is diluted with water, resulting in precipitation of the crude product, melting at about 247–251°. Recrystallization from acetone-hexane results in pure 17α-ethyl-3,5-cycloandrostane-6β,17β,19-triol, melting at about 248–253°. This compound is represented by the structural formula

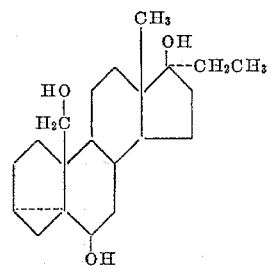

Example 7

To a solution of 4 parts of 6β,19-dihydroxy-3,5-cycloandrostan-17-one in 350 parts of ether is added 20 parts by volume of 3 N ethyl magnesium bromide in ether. This reaction mixture is stirred at room temperature for about 30 minutes, at the end of which time an additional 20 parts by volume of ethereal ethyl magnesium bromide is added and stirring is continued for about 15 minutes longer. Ethyl acetate and water are successively added, and the organic layer is separated and concentrated to afford an oil. This oil is crystallized from ether, then is recrystallized from aqueous methanol, and the crystals obtained are washed with acetone and dried to afford 17α-ethyl-3,5-cycloandrostane-6β,17β,19-triol, identical with the substance obtained in Example 6.

Example 8

A mixture of 5 parts of 6β,19-dihydroxy-3,5-cycloandrostan-17-one, 122 parts of formic acid, and 3.6 parts of triethylamine is allowed to stand at room temperature for about 2 hours, then is diluted with water. The solid which precipitates is collected by filtration and dried to yield 3β,19-dihydroxyandrost-5-en-17-one, 3,19-diformate, M.P. about 120–128°. It is dissolved in 160 parts of methanol containing 20 parts by volume of 10% aqueous sodium hydroxide, and, after a few minutes, the mixture is diluted with water and extracted with ether. The ether extract is washed with water, dried over anhydrous sodium sulfate, and concentrated to dryness to afford 3β,19-dihydroxyandrost-5-en-17-one, melting at about 219–222°.

Example 9

A mixture of 1.05 parts of 6β,19-dihydroxy-3,5-cycloandrostan-17-one, 24.4 parts of formic acid, and 1.46 parts of triethylamine is allowed to stand at room temperature for about 2 hours, then is diluted with about 150 parts of water. The product, which separates initially as an oil, crystallizes on standing, and these crystals are dried in air, then dissolved in 43.5 parts of toluene containing 19 parts of cyclohexanone. Traces of moisture are removed by distillation, and 5 parts by volume of 25% aluminum isopropoxide in toluene are then added. This reaction mixture is heated at reflux for about 30 minutes, then is cooled, and approximately 200 parts by volume for saturated aqueous sodium potassium tartrate are added. The resulting aqueous mixture is steam-distilled, and the residue is extracted with ether. Distillation of ether from the organic solution affords an oily residue which is washed with pentane, and is crystallized first from acetone-hexane then from ether-hexane to yield 19-hydroxyandrost-4-ene-3,17-dione, melting at about 170–173°.

Example 10

To a solution of 3.02 parts of 19-hydroxyandrost-4-ene-3,17-dione in 134 parts of acetone is added, at 10°, in an atmosphere of nitrogen with stirring, 2.8 parts by volume of an aqueous solution, 8 N in chromium trioxide and 8 N in sulfuric acid. The reaction mixture is stirred for several minutes, then is diluted with water and is extracted with methylene chloride. The resulting organic extract is stripped of solvent, and the residual oil is crystallized from hexane to produce 19-oxoandrost-4-ene-3,17-dione.

Example 11

A mixture of 3.8 parts of 19-oxoandrost-4-ene-3,17-dione, 400 parts of methanol, and 100 parts by volume of 10% aqueous sodium hydroxide is kept at room temperature for several minutes, then is diluted with water. The resulting aqueous solution is concentrated under reduced pressure, and the crystals which separate are collected by filtration and dried to afford 19-norandrost-4-ene-3,17-dione, melting at about 162–168°. Recrystallization from ether-hexane affords a pure sample, characterized by a melting point of about 170–172°.

What is claimed is:
1. A compound of the structural formula

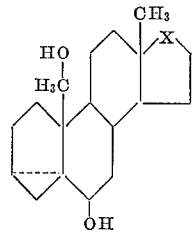

wherein X is selected from the group consisting of carbonyl, β-hydroxymethylene, and α-(lower alkyl)-β-hydroxymethylene radicals.

2. 6β,19-dihydroxy-3,5-cycloandrostan-17-one.
3. 3,5-cycloandrostane-6β,17β,19-triol.
4. A compound of the structural formula

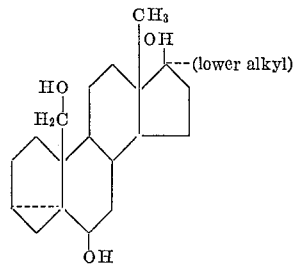

5. 17α-methyl-3,5-cycloandrostane-6β,17β,19-triol.
6. 17α-ethyl-3,5-cycloandrostane-6β,17β,19-triol.
7. 17α-ethynyl-3,5-cycloandrostane-6β,17β,19-triol.

No references cited.